Patented Oct. 7, 1924.

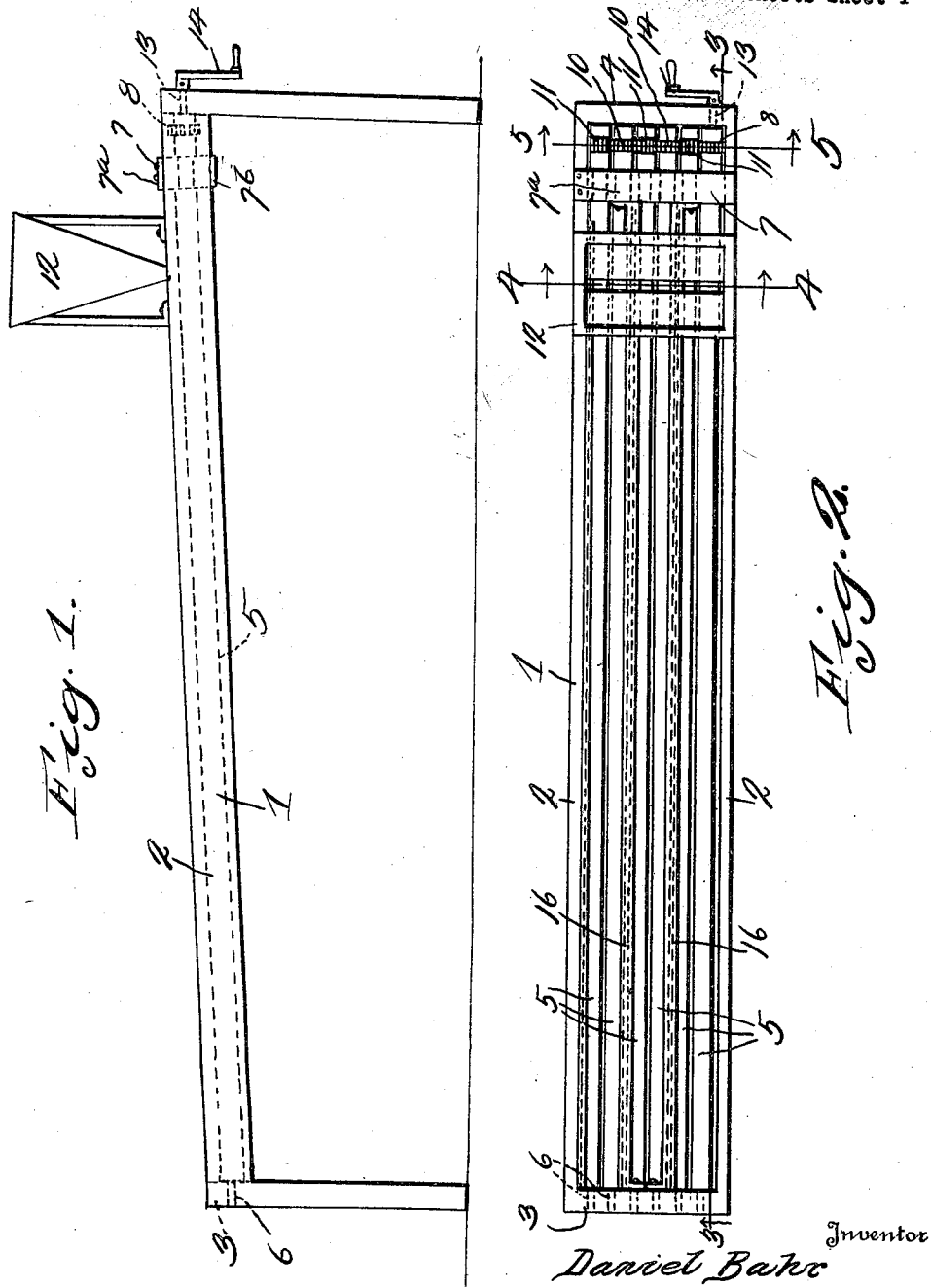

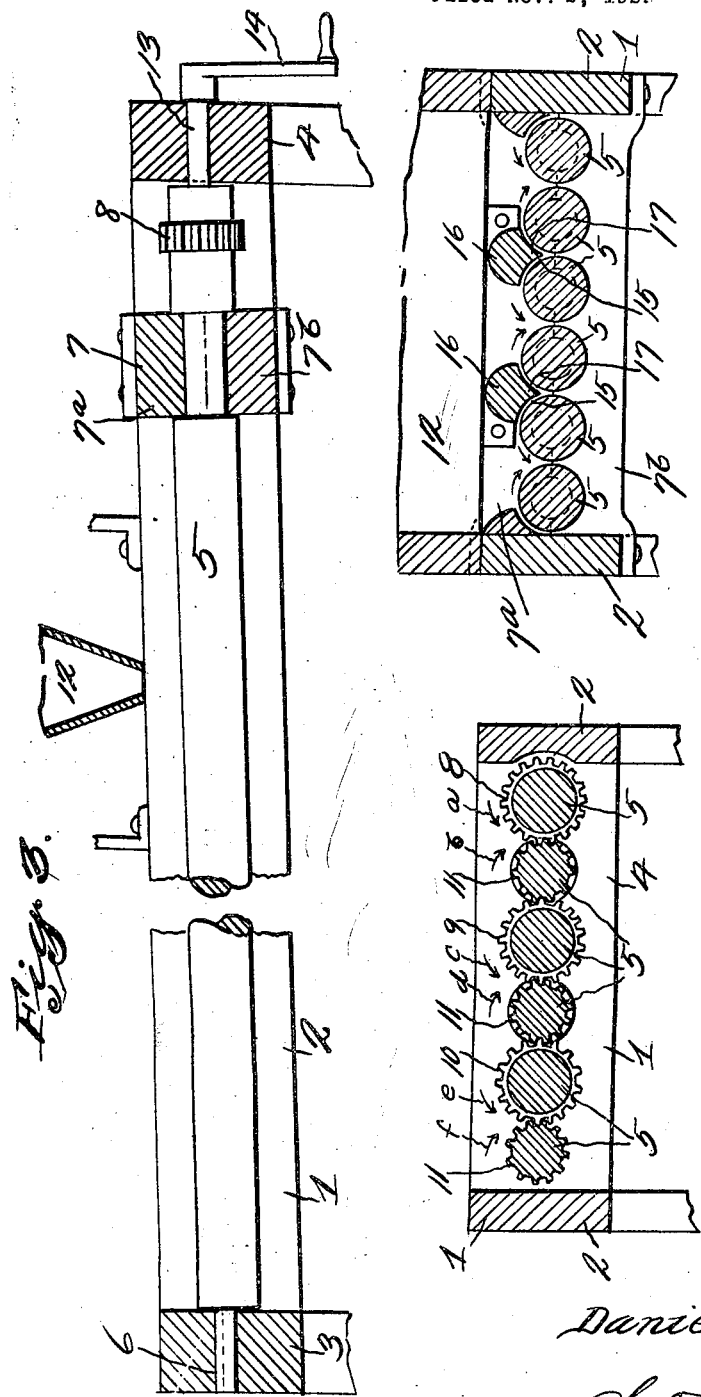

1,510,578

UNITED STATES PATENT OFFICE.

DANIEL BAHR, OF DUNLAP, IOWA.

FRUIT-STEMMING MACHINE.

Application filed November 2, 1922. Serial No. 598,541.

*To all whom it may concern:*

Be it known that DANIEL BAHR, citizen of the United States, residing at Dunlap, in the county of Harrison and State of Iowa, has invented certain new and useful Improvements in Fruit-Stemming Machines, of which the following is a specification, reference being had therein to the accompanying drawings.

The invention relates to berry pickers, and has for its object to provide a device of this character particularly adapted for stemming goose berries, cherries and other fruit, and comprises a frame in which is rotatably mounted longitudinally disposed adjacent rollers, onto which the fruit drops from a hopper and rolls down the machine between the rollers in such a manner that the stems will be caught between the rollers and pulled from the fruit.

Also to provide V-shaped members extending between the rollers, which do not rotate downwardly, and forming means for causing fruit to be deposited between the downwardly and inwardly rotating rollers.

A further object is to provide gear connections between the rollers whereby upon a rotation of one of the rollers, all of the rollers will rotate. One roller is rotated preferably through an operating crank.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the stemming machine.

Figure 2 is a top plan view of the machine.

Figure 3 is a longitudinal sectional view through the machine taken on line 3—3 of Figure 2.

Figure 4 is a transverse sectional view through the machine taken on line 4—4 of Figure 2.

Figure 5 is a vertical transverse sectional view through the machine taken on line 5—5 of Figure 2.

Referring to the drawings, the numeral 1 designates the rectangular shaped frame of the machine, which frame comprises the side bars 2 and the front and rear bars 3 and 4. Disposed within the frame 1 in parallel relation to each other are longitudinally disposed stem gripping rollers 5, one end of each of which rollers is rotatably mounted in bearings 6 in the end bar 3 of the frame and the other end in the transversely disposed bearing member 7 carried by the side rails 2 of the frame. The bearing member 7 is preferably formed in two sections $7^a$ and $7^b$ whereby the rollers may be placed in position when the bearing section $7^a$ is removed. The rear ends of the rollers 5 are provided with gears 8, 9 and 10, which gears mesh with inset gear teeth 11 carried by adjacent rollers 5, which inset gear teeth allow the rollers 5 to be disposed closely adjacent each other for grasping stems of fruit as it is dropped onto the rollers from the hopper 12 disposed above the rollers. The outer roller 5, which is provided with the gear 8, is provided with a shaft 13 which extends through the end bar 4 of the frame and has secured thereto an operating crank 14 adapted to be grasped by an operator for rotating the stem pulling rollers 5. When the gear 8 is rotated in the direction of the arrow *a*, the adjacent roller 5 is rotated in the direction of the arrow *b*, thereby causing the gear 9 to rotate in the direction of the arrow *c* and the adjacent roller to one side thereof to rotate in the direction of the arrow *d*. As the roller 5 rotates in the direction of the arrow *d*, the gear 10 rotates in the direction *e* and consequently the roller 5 on which it is mounted rotates in the same direction. Gear 10 imparts a rotation of the adjacent outer roller 5 in the direction of the arrow *f* and the downward and inward rotation towards each other of the rollers grasp the stems of fruit and pull the same from the fruit.

To prevent fruit from collecting between the adjacent rollers which rotate upwardly and outwardly from each other, as at 15, longitudinally disposed strips 16 are provided, the V-shaped portions 17 of which extend between the adjacent rollers 5, and the bodies thereof extend above the rollers in such a manner that fruit will be deflected between the rollers which rotate downwardly towards each other, thereby insuring the proper positioning of all the fruit for stemming purposes. It will be seen that the rollers 5 incline slightly and consequently the fruit will roll towards the lower end of the machine where it may be collected or discharged as desired.

From the above it will be seen that a fruit stemming machine is provided, which is simple in construction, the parts reduced to a minimum, and one wherein various kinds of fruit may be easily and quickly stemmed. It will also be seen that a single operator may operate the device thereby reducing the cost of labor to a minimum.

The invention having been set forth what is claimed as new and useful is:—

A fruit stemming machine, said machine comprising a frame, a plurality of parallel inclined rollers rotatably mounted in bearings of the frame, gear connections between said rollers, alternate rollers being provided with external gear teeth, alternate rollers being provided with inset gear teeth having their outer ends registering with the periphery of the rollers and meshing with the external gear teeth of adjacent rollers, adjacent pairs of rollers rotating towards each other and downwardly, deflecting strips disposed above and between the axis of the adjacent pairs of rollers and extending downwardly between the rollers forming means for deflecting fruit between the rollers which revolve towards each other and downwardly and means whereby one of said rollers may be rotated for imparting rotation to all of the rollers through the gear connections.

In testimony whereof I hereunto affix my signature.

DANIEL BAHR.